Nov. 11, 1924.                    J. J. RYTELL                    1,514,863
                                  WEED PULLER
                              Filed April 17, 1923
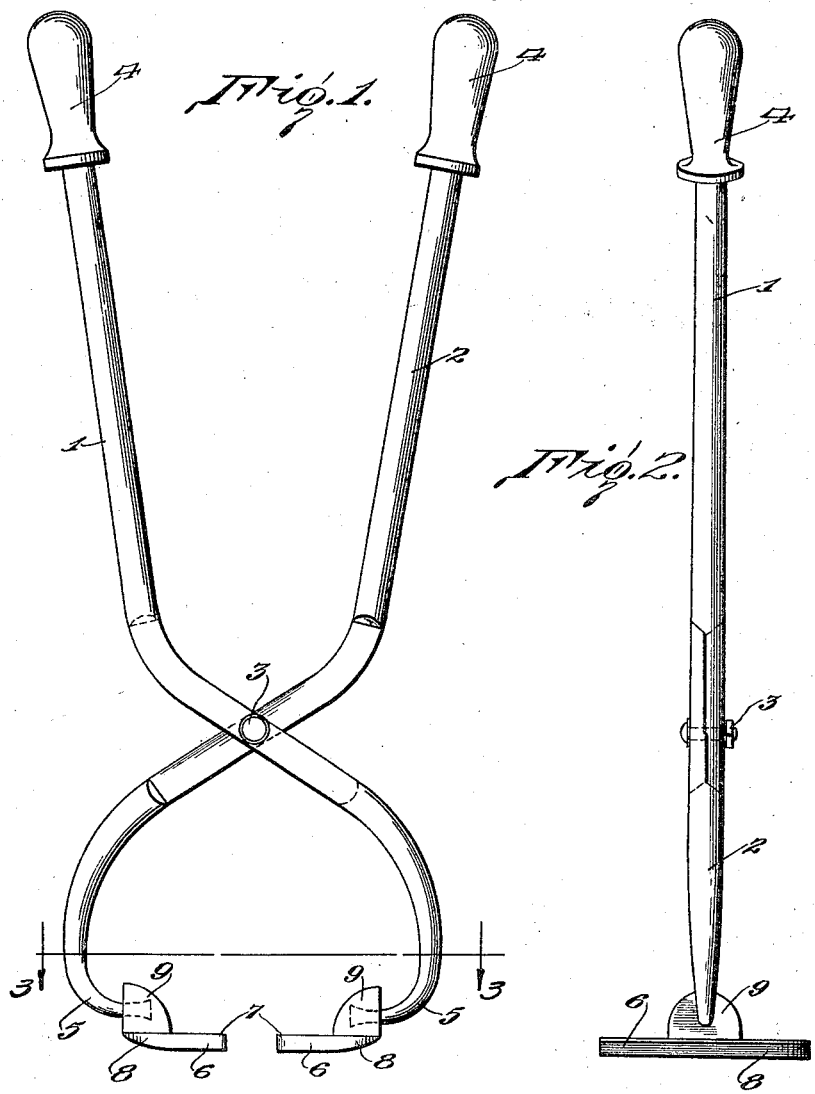
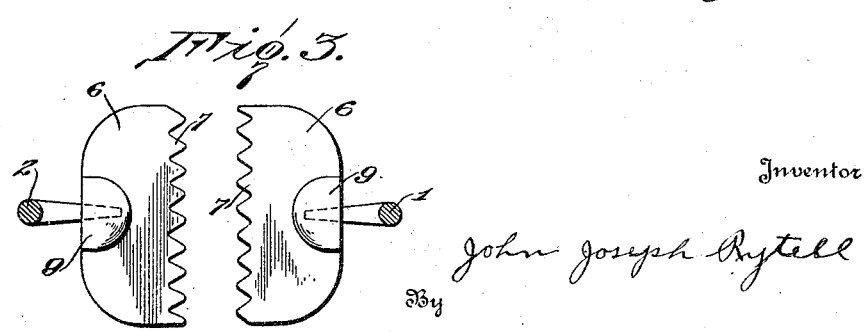
Inventor
John Joseph Rytell
By
                                                    Attorney Patented Nov. 11, 1924.

1,514,863

UNITED STATES PATENT OFFICE.

JOHN JOSEPH RYTELL, OF GLENS FALLS, NEW YORK.

WEED PULLER.

Application filed April 17, 1923. Serial No. 632,698.

*To all whom it may concern:*

Be it known that I, JOHN J. RYTELL, a citizen of the United States, residing at Glens Falls, in the county of Warren and State of New York, have invented certain new and useful Improvements in a Weed Puller, of which the following is a specification.

This invention relates to weed pullers and has for its principal object to provide an improved construction for a device of this character that will eliminate the tiresome and extremely slow method of pulling weeds by bending over and grasping same in the hands of the operator.

A further object of the invention is to provide a weed puller, comprising a tool having handles pivotally connected and weed engaging jaws removably secured to each of the handles, so that by bringing the handles together, the jaws are brought into engagement with the weed and the stem of same is firmly engaged to permit the weeds and roots to be readily removed from the ground.

A still further object of my invention is to provide a weed puller, which is simple in construction, durable, efficient for the purpose intended, and one that can be manufactured and placed on sale at a low cost.

These and like objects of the invention will be better understood as the description follows and as is specifically pointed out in the appended claims.

Referring to the accompanying drawing which forms a part of this specification and which clearly illustrates the construction and operation of my improved weed puller, Figure 1 is a side elevation of a weed puller constructed in accordance with my invention.

Figure 2 is an end view of same, and

Figure 3 is a plan view of the clamping jaws taken on line 3—3 of Figure 1.

Referring to the accompanying drawing in detail, like characters will be used to designate like parts in the different views.

In the drawing, the numerals 1 and 2 designate a pair of operating handles, which are pivotally connected as at 3 and the upper end of each of the handles 1 and 2 is provided with a hand grip 4. The lower end of each of the handles 1 and 2 is bent inwardly as at 5.

The free end of each of the handles 1 and 2 is provided with a flattened head, as is clearly indicated by dotted lines in Figures 1 and 3.

A weed engaging jaw 6 of which there are two, is provided along one edge with a serrated edge 7 whereby the teeth of the serrated edge are rounded so that the jaws will not cut a weed when brought into engagement with same. The jaws are tapered as at 8 to reduce the weight of the jaws and the cost of manufacture. A shoulder 9 is formed integral with the upper side of each of the jaws, said shoulder being formed on the tapered edge and in approximately the center of the jaw. The shoulders are each provided with a slot for receiving therein the flattened end of the handles 1 and 2, as is clearly indicated by dotted lines in Figures 1 and 3.

In view of the foregoing description of my invention taken in connection with the accompanyng drawing, it is thought that any further explanation as to the construction, operation, and objects of the invention is unnecessary.

While I have shown and described the preferred form of my weed puller, I realize that various minor changes may be resorted to, without departing from the spirit and scope of the invention as claimed, and therefore, I do not wish to limit myself to the exact details of construction shown, nor to the combination and arrangement of parts.

What I claim as new and desire to secure by Letters Patent is:

1. In a weed puller, comprising a pair of handles pivotally connected together, hand grips formed upon the upper ends of each of said handles, the lower ends of said handles being bent at right angles and adapted to be on a horizontal plane and weed engaging jaws having openings therein for receiving the horizontal bent portions of said handles.

2. In a weed puller, comprising a pair of pivotally connected handles, the lower ends of said handles being bent at right angles and adapted to lie on a horizontal plane, a pair of weed engaging jaws, said jaws being provided with a serrated edge, and means for rigidly securing said jaws to the lower ends of the handles so that same are on a horizontal plane and below the horizontal plane of the inwardly bent ends of the handles.

In testimony whereof, I have affixed my signature in the presence of two witnesses.

JOHN JOSEPH RYTELL.

Witnesses:
 JOSEPH WILLIAM ANGER,
 LOUIS CASPER HENDERSON.